United States Patent Office 3,065,890
Patented Nov. 27, 1962

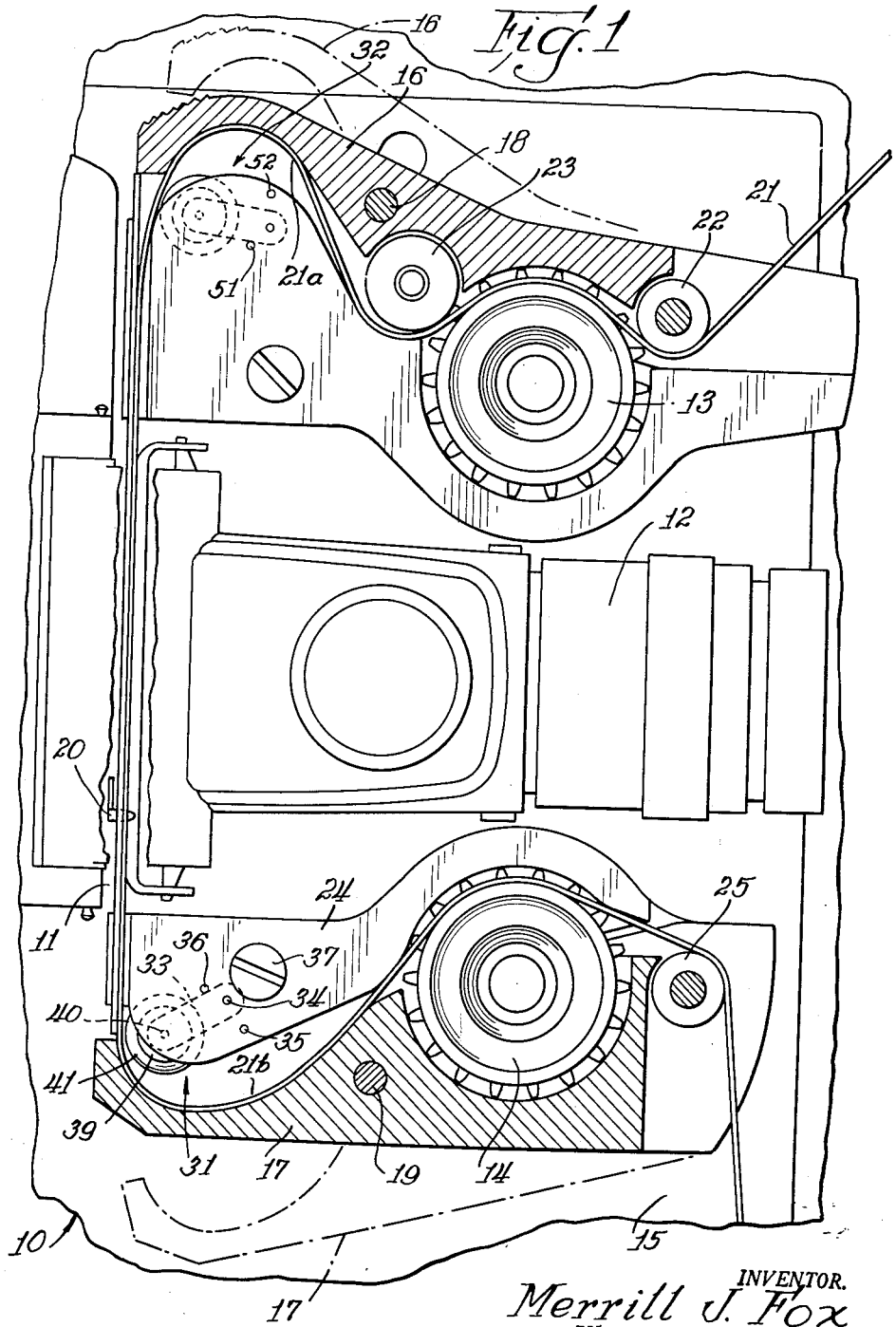

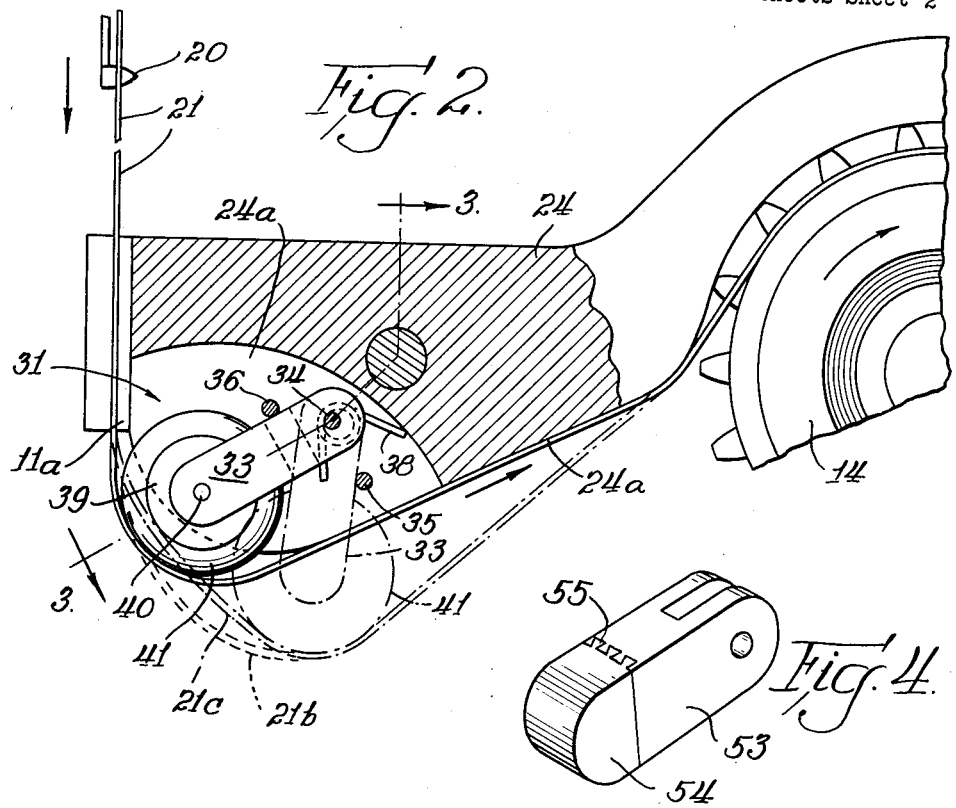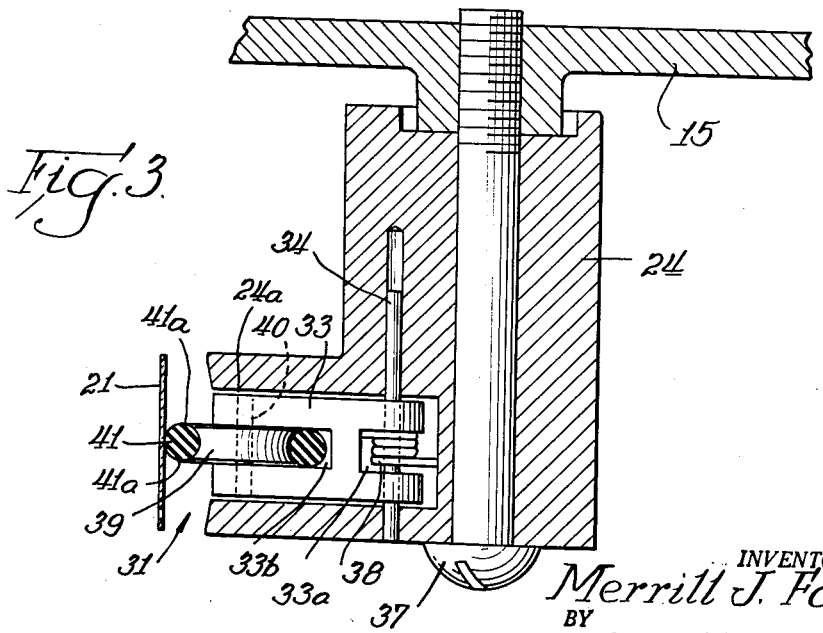

3,065,890
LOOP RESTORER
Merrill J. Fox, Chicago, Ill., assignor to Bell & Howell Company, Chicago, Ill., a corporation of Illinois
Filed May 29, 1959, Ser. No. 816,821
4 Claims. (Cl. 226—36)

This invention relates to a loop restorer, and more particularly to a loop restorer of a motion picture projector operable by the film.

An object of the invention is to provide a loop restorer operable to restore a loop of a motion picture projector instantaneously after it is lost.

Another object of the invention is to provide a pivoted loop restorer biased to a retracted position which is engaged by film when a loop is lost and swung by frictional engagement of the film thereon to a loop-restoring position after which the restorer is swung back to its retracted position.

Another object of the invention is to provide a loop restorer having a pivotal arm carrying a frictional roller which resists rotation and is engaged by the film when a loop is lost to swing the arm to restore the loop.

Still another object of the invention is to provide a motion picture projector having a loop restorer including a spring-pressed, pivotal arm having a resilient tip on the free end thereof adapted to be engaged by film when a loop is lost for restoring the loop.

A complete understanding of the invention may be obtained from the following detailed description of loop restorers forming specific embodiments thereof, when read in conjunction with the appended drawings, in which:

FIG. 1 is a fragmentary, partially sectional, side elevation view of a motion picture projector having loop restorers embodying the invention;

FIG. 2 is an enlarged, fragmentary side elevation view of the projector shown in FIG. 1 with portions thereof shown in section;

FIG. 3 is a sectional view taken along line 3—3 of FIG. 2; and

FIG. 4 is a perspective view of a loop restorer forming an alternate embodiment of the invention.

The invention provides a loop restorer for a motion picture projector. In one form of the invention, the loop restorer may include an arm mounted pivotally near the gate of a projector and biased toward a retracted position in which a roller on the free end thereof is near the entrance portion of a loop of film. The roller preferably has a rubber or plastic rim or tire which frictionally engages the arm to resist rotation, and when the loop is lost, the film pulls into engagement with the tire and swings the arm to a loop-restoring position and the arm pulls the film through the gate to restore the loop. Then as the gate pawl advances the film to increase the loop, the arm is spring-pressed back to its retracted position. In a loop restorer forming an alternate embodiment of the invention, there may be an arm spring-pressed to a retracted position and having a frictional tip which is engaged by the film when the loop is lost and which swings the arm to a loop-restoring position.

In FIG. 1, there is shown a motion picture projector 10 having a gate 11 together with a lens holder 12, an upper feed sprocket 13 and a lower feed sprocket 14. These elements are mounted on a vertical frame 15. The projector includes an upper loop former 16 and a lower loop former 17 mounted pivotally on pins 18 and 19, and has a shuttle 20 for intermittently advancing perforated film 21, the sprockets 13 and 14 serving to advance the film continuously. The projector is operable either forward or reverse. In forward operation the sprocket 13 is rotated counter-clockwise, and the sprocket 14 clockwise and the shuttle feeding the film during its downward stroke. In reverse operation, the feed directions of these elements are reversed. The loop formers are shown by the broken lines in their retracted positions in which loops 21a and 21b of the film are not in contact with the loop formers. The loop formers are interconnected with one another and are movable toward each other to loop forming or threading positions for initially threading the film through the gate with the loops and guiding the film between the sprockets and the gate. Sprocket guide rollers 22 and 23 aid in guiding the film over the upper sprocket, and guide member 24 and guide roller 25 guide the film over the lower sprocket.

In order to restore the loop 21b when it is lost during forward operation, a loop restorer 31 is provided. In order to restore the loop 21a when lost during reverse operation, a loop restorer 32 is provided. The loop restorer 32 is identical with the loop restorer 31 but is reversed relative thereto, and for simplification, only the loop restorer 31 will be described in detail. The loop restorer 31 includes an arm 33 pivotally mounted on a pin 34 between stop pins 35 and 36. The arm is pivotal in a slot 24a in the member 24 which is secured to the frame 15 by screw 37. A torsion spring 38 mounted on the pin 34 in an end slot 33a in the arm 33 biases the arm 33 toward a retracted position in which the arm 33 abuts the stop pin 36. A grooved roller 39 mounted rotatably on the arm 33 by a pin 40 carries a rim or tire 41 composed of a resilient frictional material such as, for example, a rubber or plastic compound. One excellent composition is a twenty durometer hardness, Buna-S compound. The tire has flat sides 41a, which frictionally engage the side walls of the slot 33b to provide a braking action tending to resist rotation of the tire and roller 39.

When the loop 21b is lost by the shuttle not advancing the film due to one or more faulty film perforations or the like, the film assumes its full-line position shown in FIG. 2 and engages the tire 41. The sprocket 14 advances the film to the right, the film frictionally engages the tire and swings the arm to its broken-line position. This lengthens the path of the film to form the loop 21c, guide 11a and surface 24a also aiding in restoring the loop. After the loop is restored, the shuttle 20 feeding the film more rapidly during its feed stroke than the sprocket 14 provides a slight increment in the loop 21c to form the loop 21b, which does not press against the tire 41. This frees the tire, and the spring 38 returns the arm 33 to its retracted position. Normally, the braking action between the tire and arm keeps the roller from turning during the loop restoring operation but if tension on the film approaches an excessive condition, the roller turns against the braking action to slow the swinging action of the arm 33, thereby reducing force on the film. Also, when the arm engages stop pin 35, the roller may rotate against the braking action to reduce force thereof on the film.

When there is only one or two damaged perforations in the film, the friction between the tire 41 and arm 33 prevents appreciable rotation of the tire relative to the arm. However, if a greater length of the film is damaged so that the shuttle does not feed even after arm 33 has been moved to its operative position, the tire 41 and roller may be rotated by the film as the sprocket 14 advances it and pulls it down through the gate.

Whenever the projector 11 is operated in reverse and the upper loop 21a (FIG. 1) is lost, the loop restorer 32 is operative to restore the loop 21a. The restorer 32 in restoring the loop 21a is swung clockwise from stop 51 to stop 52, and the operation thereof is identical with that of the restorer 31 but is reversed relative thereto. It should be noted that the restorers require only a short pivotal movement, under forty-five degrees, to restore the loops, and restore the loops before the loss thereof is apparent in the projection.

In the modification shown in FIG. 4, there is provided a pivoted arm 53 having a rounded, resilient, frictional tip 54 of rubber, plastic or the like which is contacted by the film when the loop is lost. When used, the arm 53 is substituted for the arm 33 (FIG. 3), the tip 54 serving the function of the tire 41. The tip is locked to the arm 53 by suitable means such as, for example, adhesion and a dovetail joint 55. The tip 54 contacts a much wider area of the film than the tire 41 and, hence, may have a substantially lower coefficient of friction than that of the tire 41.

The above described loop restorers rapidly restore lost loops, and are rugged and sure in construction and operation.

While the invention is thus described, it is not wished to be limited to the precise details described, as changes may be readily made without departing from the spirit of the invention.

What is claimed is:

1. In a loop restorer for a motion picture projector having a gate, means for advancing film through the gate and second means for advancing film from the gate with a loop having entrance and exit portions between the gate and the second means, the improvement comprising; an arm, means mounting the arm for limited pivotal movement within the loop, frictional means on the free end of the arm, and means normally positioning the arm in a retracted position in which the frictional means is adjacent to and out of contact with the entrance portion of the loop and permitting swinging movement of the arm when the loop is lost to lengthen the path of the film and restore the loop, said swinging movement of the arm being caused by the engagement of the frictional means by the film so as to be driven by said film in a loop restoring direction.

2. In a motion picture projector including a gate, a sprocket spaced from the film exit of the gate and an intermittent film transport at the gate normally feeding film in a loop having entrance and exit portions toward the sprocket, a loop restorer comprising arm means mounted for limited pivotal movement in a position inside the loop of the film, and means urging the arm means toward a retracted position at one limit of its pivotal movement in which the free end of the arm means is adjacent to the entrance portion of the loop and permitting movement of the arm means by the film to a loop restoring position in which the free end of the arm means is adjacent to the central portion of the loop, the free end of the arm means being rounded to frictionally engage the film and be pivoted thereby toward its other limit of pivotal movement without damage to said film.

3. The combination defined by claim 2 wherein the arm means includes an arm, a roller rotatable on the free end of the arm and a tire of friction material fixed to the periphery of the roller in a position frictionally engaging the arm and extending beyond the free end of the arm.

4. The combination defined by claim 2 wherein the arm means includes an arm having a free end and a rounded tip of friction material mounted on the free end of the arm.

References Cited in the file of this patent

UNITED STATES PATENTS

| | | |
|---|---|---|
| 225,557 | Brown | Mar. 16, 1880 |
| 2,407,795 | Nelson | Sept. 17, 1946 |
| 2,418,361 | McNabb | Apr. 1, 1947 |
| 2,570,176 | Wittel | Oct. 2, 1951 |

FOREIGN PATENTS

| | | |
|---|---|---|
| 513,983 | Italy | Feb. 8, 1955 |